US007949891B2

(12) United States Patent
Namiki

(10) Patent No.: US 7,949,891 B2
(45) Date of Patent: May 24, 2011

(54) TIMER CIRCUIT STORING A PLURALITY OF TIME MEASUREMENTS WITH DIFFERENT SETS OF MEASUREMENT TIME THAT CAN BE REALIZED BY STARTING THE TIME MEASUREMENTS ASYNCHRONOUSLY

(75) Inventor: Hideo Namiki, Tokyo (JP)

(73) Assignee: NEC Corporation, Tokyo (JP)

( * ) Notice: Subject to any disclaimer, the term of this patent is extended or adjusted under 35 U.S.C. 154(b) by 859 days.

(21) Appl. No.: 11/908,468

(22) PCT Filed: Mar. 31, 2006

(86) PCT No.: PCT/JP2006/306832
§ 371 (c)(1),
(2), (4) Date: Sep. 12, 2007

(87) PCT Pub. No.: WO2006/106917
PCT Pub. Date: Oct. 12, 2006

(65) Prior Publication Data

US 2009/0083568 A1 Mar. 26, 2009

(30) Foreign Application Priority Data

Mar. 31, 2005 (JP) ................................ 2005-102805

(51) Int. Cl.
*G06F 1/14* (2006.01)
*G06F 1/00* (2006.01)
*G06F 11/00* (2006.01)

(52) U.S. Cl. .......................... 713/502; 713/500; 714/55

(58) Field of Classification Search .................. 713/502
See application file for complete search history.

(56) References Cited

U.S. PATENT DOCUMENTS 5,491,815 A 2/1996 Basso et al.
5,983,356 A * 11/1999 Pandey et al. ................ 713/322
6,002,737 A 12/1999 Devanagundy et al.
6,046,965 A * 4/2000 Oba .............................. 368/73
6,504,876 B1 1/2003 Suto
6,550,015 B1 4/2003 Craycraft et al.
7,689,875 B2 * 3/2010 Cahill et al. .................. 714/55
2003/0172314 A1 9/2003 Walter et al.

FOREIGN PATENT DOCUMENTS

JP 01096869 A * 4/1989
JP 1-229311 A 9/1989
JP 01-288913 A 11/1989
JP 01288913 A * 11/1989
JP 2-013882 A 1/1990
JP 05-333956 A 12/1993

(Continued)

*Primary Examiner* — Suresh K Suryawanshi
(74) *Attorney, Agent, or Firm* — Sughrue Mion, PLLC

(57) ABSTRACT

A timer circuit for a mobile communication terminal includes a counter operating under a reference clock, a storage unit that stores a timer timeout time corresponding to a time measurement request when receiving the time measurement request from a CPU, and a comparator 104 that generates an interruption signal to the CPU 120 when the time corresponding to the output value of the counter is coincident with the timer timeout time stored in the storage unit. The storage unit stores a plurality of sets of timer timeout time corresponding to a plurality of time measurement requests, and a stored timer timeout time which is closest to the time corresponding to the output value of the counter is set to the timer timeout time to be compared by the comparator.

6 Claims, 11 Drawing Sheets

FOREIGN PATENT DOCUMENTS

| | | | | |
|---|---|---|---|---|
| JP | 07-005279 | A | | 1/1995 |
| JP | 10-177479 | A | | 6/1998 |
| JP | 2000-047880 | A | | 2/2000 |
| JP | 2000-222250 | A | | 8/2000 |
| JP | 2001290748 | A | * | 10/2001 |
| JP | 2002-182929 | A | | 6/2002 |

* cited by examiner

TIMER CIRCUIT STORING A PLURALITY OF TIME MEASUREMENTS WITH DIFFERENT SETS OF MEASUREMENT TIME THAT CAN BE REALIZED BY STARTING THE TIME MEASUREMENTS ASYNCHRONOUSLY

TECHNICAL FIELD

The present invention relates to a timer circuit, a mobile communication terminal using the same, and an electronic device using the same, and more particularly, to a timer circuit that is mounted on an electronic device such as a mobile communication terminal.

BACKGROUND ART

Software, which controls a mobile communication terminal, performs various controls by making a timer circuit which is generally configured by hardware operate. The measurement employing a timer circuit is used in a case of arbitrating the timing in the hardware control and software processing, and in a case of monitoring the communication with an upper device being the other communication party.

In the former case, the measurement time period is generally short, and it is rarely necessary to measure a plurality of different sets of time concurrently using a timer circuit. On the other hand, in the latter case, a plurality of different sets of time are often measured with a plurality of different timings, and it is necessary to measure a plurality of different sets of time concurrently using a timer circuit. In case of measuring a plurality of different sets of time concurrently, the measurement can be realized by mounting all the required timer circuits. However, in this case, the circuit size becomes large, and, especially, this configuration is not practical for a mobile communication terminal which has to be reduced in size. Accordingly, by mounting limited required timer circuits, the minimum time period (for example, one second) is measured by the timer circuits, a CPU is periodically made to generate an interruption every measured minimum time period, counting is performed in the software processing by the CPU every time the interruption is generated, and the count value is updated. In this way, a plurality of time measurements with different sets of measurement time can be realized by starting the time measurements asynchronously.

DISCLOSURE OF THE INVENTION

Problems to be Solved by the Invention

However, in above-described conventional technique, even if the function of performing a plurality of time measurements can be realized, since the software processing by the CPU occurs every minimum time period which is measured by the timer circuits, the consumption current is often increased according to the occurrence frequency of the CPU performance. Furthermore, since the measurement by the timer circuits is started and ended every minimum time period, measurement errors are often raised. This defect will be explained with reference to FIG. 12.

FIG. 12 shows a timing chart indicative of the performance of a conventional timer circuit. In FIG. 12, Ta, Tb, Tc represent the time when a time measurement (measurement) is required (Ta>Tb>Tc). TIMER_INT is an interruption signal which the timer circuit makes a CPU generate, COUNTER is the count value which is counted by the CPU, and INT is an interruption signal which is actually required and is generated by the CPU when receiving the time measurement requirement, respectively. Furthermore, 0 to T8 represent count values (COUNTER) corresponding to the time measurement start and time measurement timeout of the time Ta, Tb, Tc.

In case of the conventional case shown in FIG. 12, after a time measurement requirement of the time Ta is sent from the CPU, before the time measurement is ended, a time measurement requirement of the time Tb is sent. Then, before the time measurement of the time Tb time outs, a time measurement requirement of the time Tc of the first time is sent. After the time measurement of the time Tb time outs, a time measurement requirement of the time Tc of the second time to fourth time is sent, and then the time measurement of the time Ta time outs. In this case, the measurement performance by the timer circuit is started when the timer operates along with the time measurement requirement of the time Ta, and the timer circuit periodically makes the CPU generate the interruption signal (TIMER_INT) every reference timer (minimum time period). Then, counting is performed in the software processing by the CPU every time the interruption is generated, and the count value (COUNTER) is updated. Accordingly, the CPU counts the time T3 to T8 which should be timekept due to the time measurement requirements of the time Ta, Tb, Tc, and concurrently generates the interruption signal (INT) in series which is actually required. After generating the interruption signal (INT) corresponding to the time measurement of the time T8, the measurement performance by the timer circuit is ended, and periodically generating the interruption signal (TIMER_INT) to the CPU is ended.

In this case, in case the reference timer is set long, since the occurrence cycle of the interruption signal (TIMER_INT) to the CPU becomes long, the performance current arising from the performance of the CPU can be reduced. However, in case the reference timer is set long, measurement errors of the required timer undesirably come to be large. For example, when there arises a time measurement requirement of concurrently performing the measurement every one minute and the measurement every thirty minutes, in case the reference timer is set up every one minute, when the time measurement requirement timing every one minute and the time measurement requirement timing every thirty minutes accord with each other, there is raised no error in the time measurement every thirty minutes. However, in case these time measurement requirement timings do not accord with each other, the time measurement every thirty minutes is rounded by the reference timer which is generated every one minute, and errors lass than one minute are undesirably raised.

The problem that is raised when realizing a plurality of different time measurements using above-described timer circuit becomes remarkable especially when such timer circuit is applied to the timer circuit of an electronic device such as a mobile communication terminal in which low electric power consumption is required, and the countermeasure therefore is desired.

As documents of the related art relevant to the conventional timer circuit, there are known JP 01-229311-A, JP 01-288913-A, JP 02-13882-A, JP 05-333956-A, JP 07-005279-A, any of which does not take above-described problem into consideration.

It is therefore an object of the present invention to provide a timer circuit that is mounted on an electronic device such as a mobile communication terminal which can realize a plurality of time measurements with different sets of measurement time with measurement errors reduced, and can reduce the power consumption.

Means for Solving the Problems

According to the present invention, there is provided a timer circuit, which comprises: a counter that operates under a reference clock; a storage unit that stores a timer timeout time corresponding to a time measurement request when receiving the time measurement request from a CPU; and a comparator that compares the time corresponding to the output value of the counter with the timer timeout time stored in the storage unit, and outputs an interruption signal to the CPU when both the two sets of time are coincident with each other; in which the storage unit stores a plurality of sets of timer timeout time corresponding to a plurality of time measurement requests, and one of those plural sets of timer timeout time which is closest to the time corresponding to the output value of the counter is set to the timer timeout time to be compared by the comparator.

According to the present invention, the storage unit includes: a first memory that stores a plurality of sets of timer timeout time corresponding to a plurality of time measurement requests; and a second memory that stores, of the plural sets of timer timeout time stored in the first memory, at least the timer timeout time which is closest to the time corresponding to the output value of the counter, and the timer timeout time stored in the second memory is set to the timer timeout time to be compared by the comparator.

According to the present invention, the storage unit includes: sort means for rearranging the plural sets of timer timeout time stored in the first memory in the order ranging from the time closest to the time corresponding to the output value of the counter; and setup means for setting up the plural sets of timer timeout time sorted by the sort means in the second memory.

According to the present invention, the second memory stores only the timer timeout time which is closest to the time corresponding to the output value of the counter. Furthermore, the second memory is updated when the plural sets of timer timeout time stored in the first memory are updated.

According to the present invention, the first memory stores enable information to set up whether the plural sets of timer timeout time are enable or disable, and enable information of the corresponding timer timeout time is set to be disable when an interruption signal is generated by the comparator, and the second memory stores the timer timeout time whose enable information is set to be enable.

According to the present invention, the first memory stores carry out information which indicates whether or not the counter is carried out, and the timer timeout time is updated based on the carry out information when the counter is carried out.

According to the present invention, the comparator includes a plurality of comparators connected to the output side of the counter, the storage unit includes a plurality of memories connected to the plural comparators individually, and the plural memories store a plurality of sets of timer timeout time corresponding to a plurality of time measurement requests individually, and the respective sets of timer timeout time are set up as the timer timeout time to be compared by the plural comparators individually.

According to the present invention, there is also provided a mobile communication terminal that has any one of above-described timer circuits.

According to the present invention, there is also provided an electronic device that has any one of above-described timer circuits.

ADVANTAGES OF THE INVENTION

According to the present invention, it becomes possible to provide a timer circuit that is mounted on an electronic device such as a mobile communication terminal which can realize a plurality of time measurements with different sets of measurement time with measurement errors reduced, and can reduce the power consumption.

EXPLANATION OF REFERENCE SYMBOLS

101 Counter
102 Time memory
103 Comparison register
104 Comparator (CMP)
106 Interrupt (INT)
120 CPU

BEST MODE FOR CARRYING OUT THE INVENTION

Hereinafter, the best mode of the timer circuit, the mobile communication terminal using the same, and the electronic device using the same according to the present invention will be described in detail referring to the accompanying drawings.

First Embodiment

Figure 1:
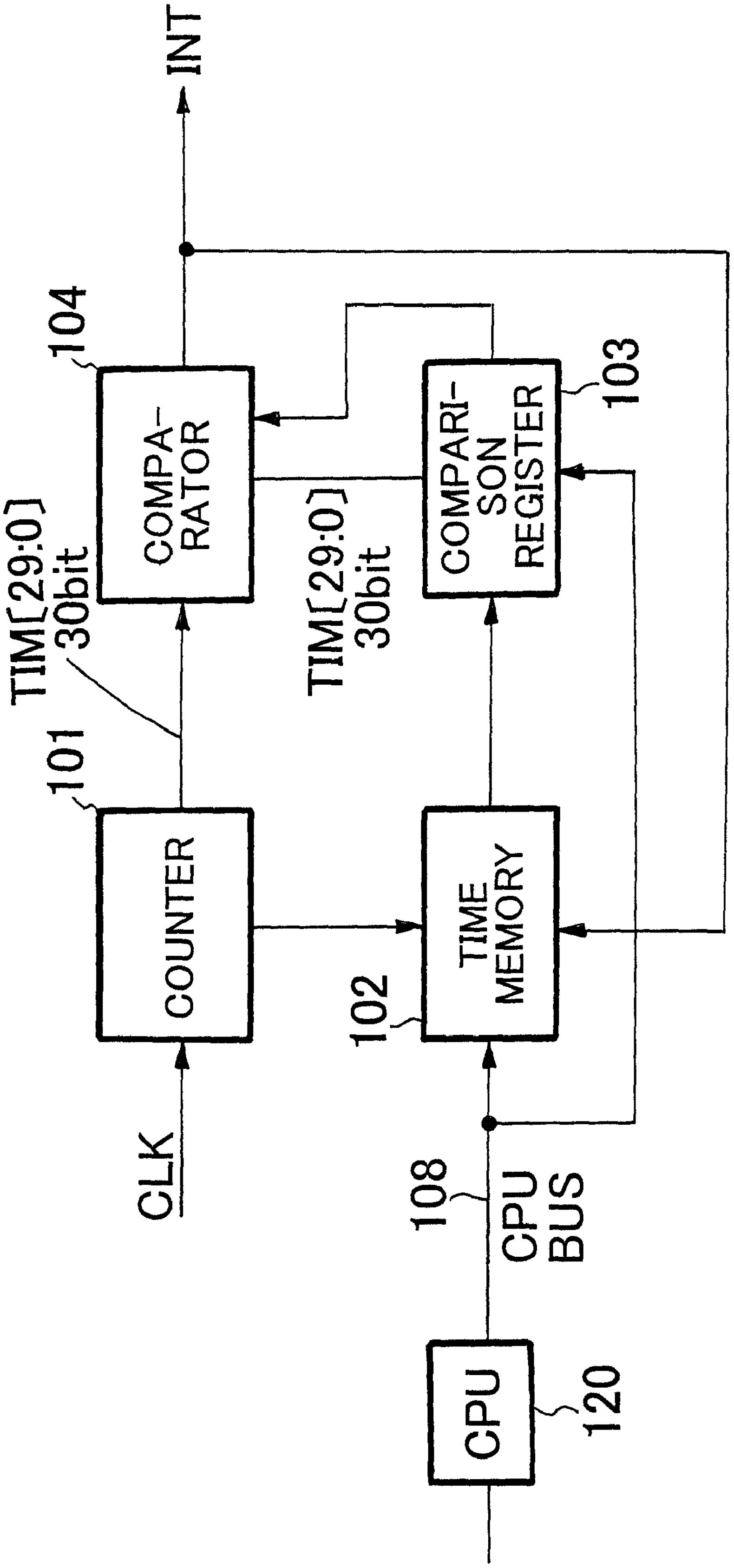
FIG. 1 shows a block diagram indicative of the configuration of a timer circuit in the first embodiment according to the present invention.

FIG. 1 shows a block diagram indicative of the configuration in the first embodiment according to the present invention. As shown in FIG. 1, the timer circuit in the first embodiment includes a counter 101, a comparator (CMP) 104, a time memory (first memory) 102, and a comparison register (second memory) 103, and is connected to a CPU 120. The time memory 102 and the comparison register 103 configure a storage unit of the present invention.

To the CPU 120, a ROM and a RAM, not shown, are connected. The ROM has stored therein various programs including a drive program for the timer circuit, which are read out to the CPU 120 to be executed according to need. The RAM is a memory that provides a work area of the CPU 120. The CPU 120 is connected to the time memory 102 and to the comparison register 103 through a CPU bus 8. The CPU 120 can input an interruption signal (INT) sent from the comparator 104.

The counter 101 carries out the counting performance based on an input clock signal CLK, and outputs the count value to the comparator 104. The counter 101 in this embodiment is configured by a counter of 30 bits, and outputs a count value TIM [29: 0] of 30 bits to the comparator 104. Furthermore, the counter 101 generates a Carry out signal (Co: Carry Out) when the counter value is returned from the maximum value to "0" to output thus generated Carry out signal to the time memory 102, notifying that the counter value is carried out. The counter value can be read out by the CPU 120.

The time memory 102 is a memory in which data including a timer timeout value to set up the time of the generation timing of an interruption signal (INT) to the CPU 120 is set up by the time measurement performance of the timer circuit. The timer timeout value is set up by adding the time of a time measurement request to the count value of the counter 101 at the time of generating the time measurement request.

Figure 2:
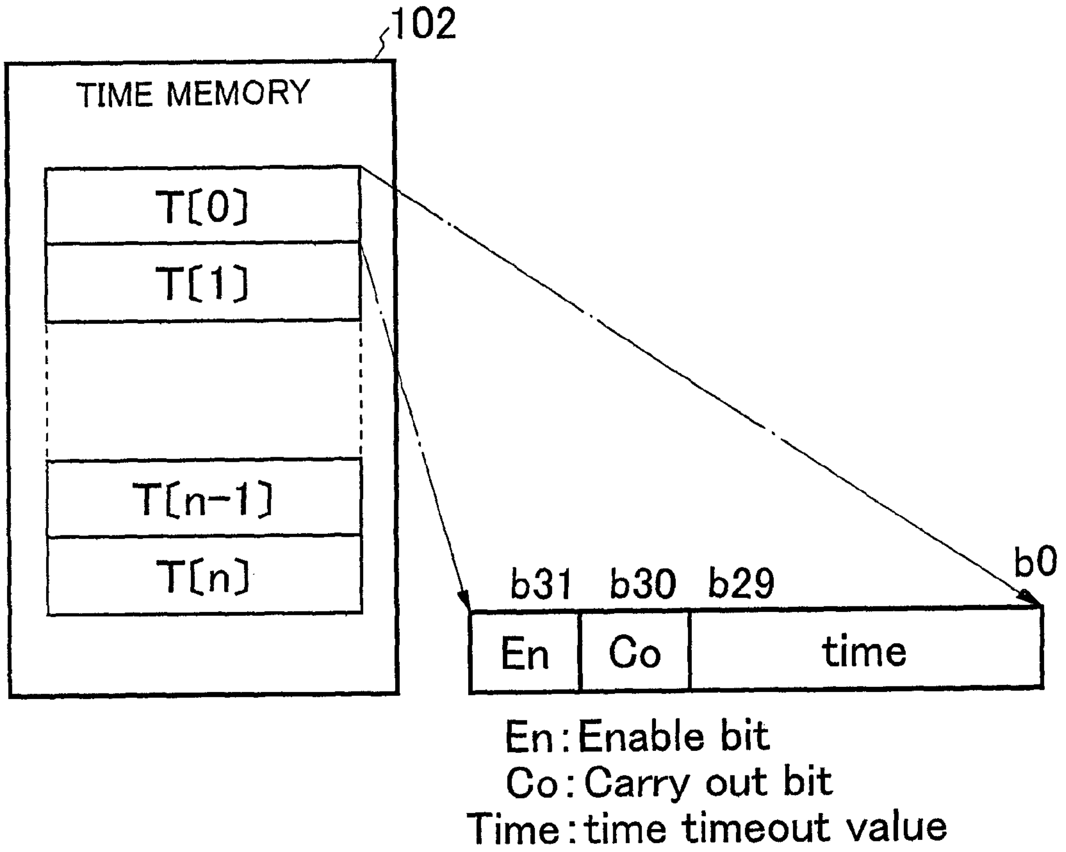
FIG. 2 shows a schematic view indicative of the configuration of data stored in a time memory shown in FIG. 1.
Figure 3:
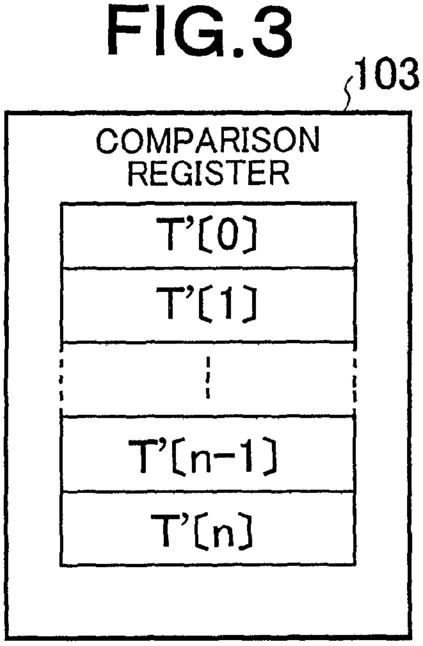
FIG. 3 shows a schematic view indicative of the configuration of data stored in a comparison register shown in FIG. 1.

In this embodiment, the time memory 102 is configured as shown in FIG. 2. In the time memory 102, as shown in FIG. 2, by the CPU 120, data of 32 bits or data T[0], T[1], . . . , T[n−1], T[n] (T[x], hereinafter) including a timer timeout value corresponding to the timer timeout time of 30 bits is set up such that the data can be updated. The respective T[x] are input in the order that the time measurement request is sent from the CPU 120. That is, to the first T[0], a timer timeout value corresponding to the time of the first time measurement request is input, and to the second T[1], a timer timeout value corresponding to the time of the second time measurement request is input, and to the n-th T [n], a timer timeout value corresponding to the time of the n-th time measurement request is input, respectively. Then, when an interruption signal from the comparator 104 to the CPU 120 is generated due to the time measurement timeout by the time measurement request, corresponding T[x] in the time memory 102 is updated.

In the respective T[x], as shown in FIG. 2, in addition to the timer timeout value of 30 bits (bit29 to bit0), a Carry out bit (Co) of one bit (bit30) and an Enable bit (En) of one bit are set up respectively.

The Carry out bit indicates that the count value of the counter 101 is carried out. In case the Carry out signal is input from the counter 101 to the time memory 102, the setup value of the Carry out bit is changed from the "0" to "1", and data in the time memory 102 is changed so that an interruption is generated under the next count value.

The Enable bit indicates whether data of the timer timeout value corresponding to the set up time is enable or disable. This Enable bit is set to be enable at the time of setting up data of the timer timeout value, and, when the comparator 104 generates an interruption signal to the CPU 120, the Enable bit is changed and set to be disable with respect to data of the timer timeout value under which the interruption signal is generated.

In this way, the timer timeout value, Enable bit, and Carry out bit of the T[x] in the time memory 102 are updated when data is updated by the setting up from the CPU 120, when an interruption signal from the comparator 104 to the CPU 120 is generated, and when the count value of the counter 101 is carried out.

In the comparison register 103, of the T[x] set up in the time memory 102 by the CPU 120, data whose Enable bit is set to be enable is sorted, and thus sorted enable data is set to be stored as T' [0], T' [1], . . . , T' [n−1], T' [n] (T' [x], hereinafter).

The respective T' [x] are updated when data is updated by the setting up from the CPU 120, when an interruption signal from the comparator 104 to the CPU 120 is generated, and when the count value of the counter 101 is carried out, respectively, and the respective T' [x] are sorted in ascending order from data closest to the count value. Accordingly, in T[0], a timer timeout value which is closest to the count value is stored, and in T[1], a timer timeout value which is second closest to the count value is stored, and in T[2] and afterward, a similarly sorted timer timeout value is stored. Of these timer timeout values, the timer timeout value stored in T[0] is output as the timer value to be compared by the comparator 104.

The comparator 104 inputs the count value output from the counter 101 and the timer value of data T' [0] stored in the comparison register 103, and determines whether or not both the values are coincident with each other. Then, in case both the values are coincident with each other, an interruption signal (INT) to the CPU 120 is generated to be output to the CPU 120.

Next, referring to FIG. 4 and FIG. 5, the performance in this embodiment will be explained.

Figure 4:
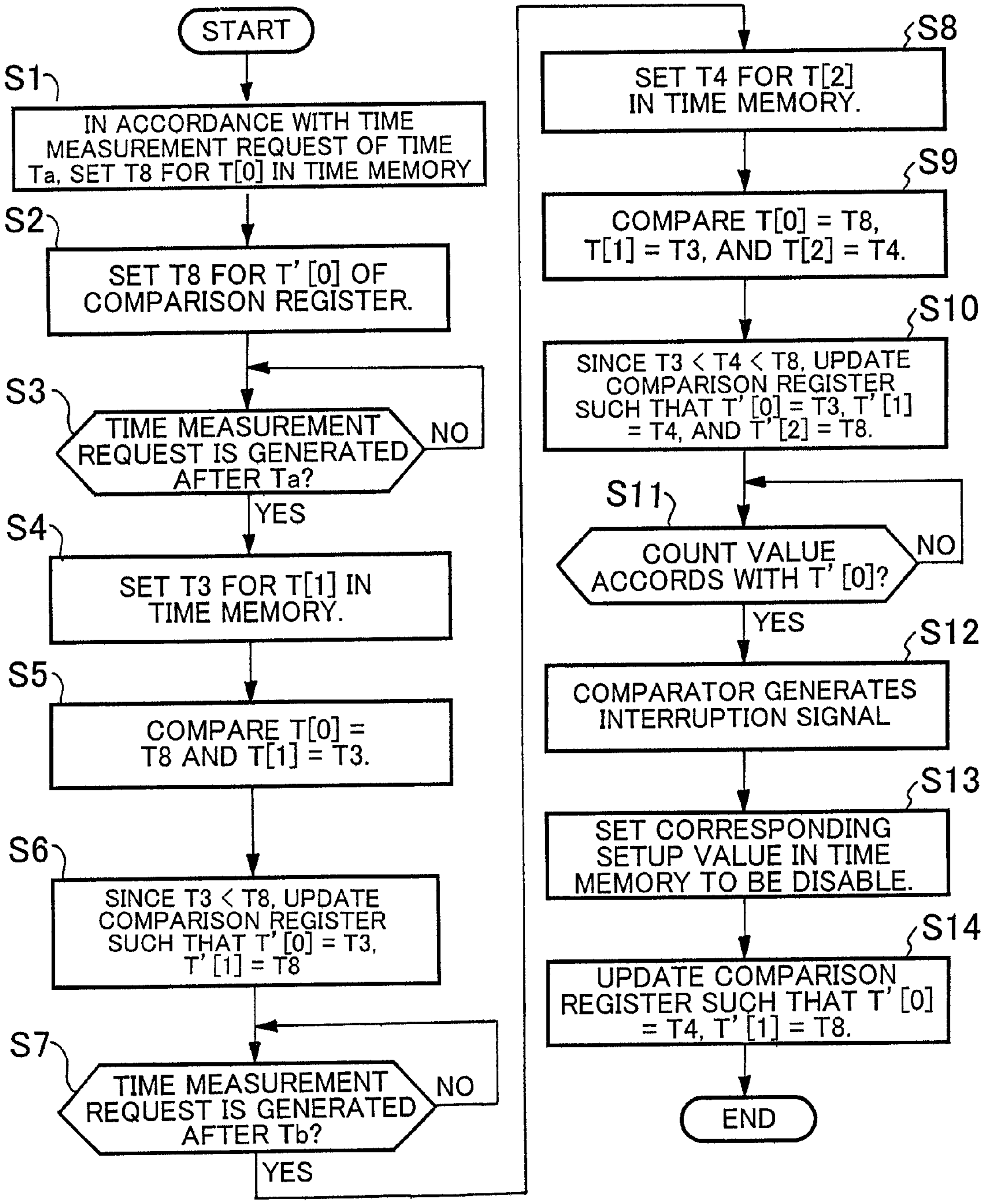
FIG. 4 shows a flowchart indicative of the performance of the timer circuit in the first embodiment according to the present invention.
Figure 5:
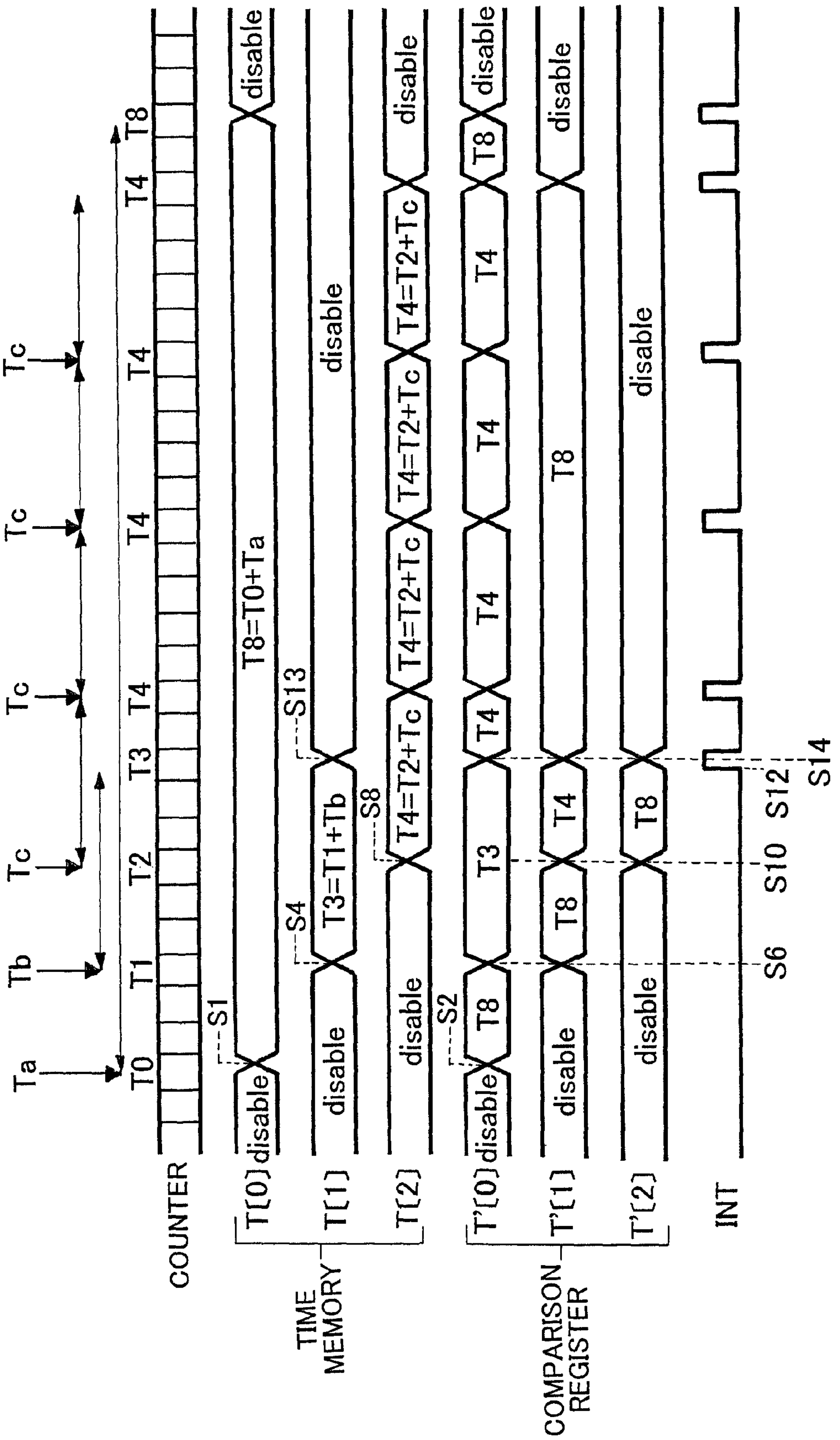
FIG. 5 shows a timing chart to explain the performance of the timer circuit in the first embodiment according to the present invention.

FIG. 4 shows a flowchart indicative of the performance in the first embodiment, and FIG. 5 shows a timing chart to explain the performance in the first embodiment. In FIG. 5, timings corresponding to respective steps in the flowchart in FIG. 4 are shown.

As shown in FIG. 4 and FIG. 5, a case in which time measurement requests of the time Ta, Tb, Tc are sent from the CPU 120 will be explained (as for the time Tc, a plurality of time measurement requests are generated).

Firstly, a time measurement request of the time Ta is generated by the CPU 120. Then, since the count value of the counter 101 is T0, the CPU 120 reads out T0 from the counter 101, and calculates T8 or adds T0 to Ta (T8=T0+Ta), and sets thus obtained T8 for the timer timeout value of T[0] in the time memory (step S1). At the time of this timer setting up, concurrently, the Enable bit of T[0] is set to be enable.

Next, since T[x] in the time memory 102 is updated, the CPU 120 sets T8 for the timer timeout value of T' [0] in the comparison register 103 (step S2). Then, the comparator 104 compares the count value of the counter 101 with T' [0]=T8 in the comparison register 103.

Next, before the count value of the counter 101 accords with the stored value of T' [0] in the comparison register 103, a time measurement request of the time Tb is generated by the CPU 120 (step S3: YES). At this time, since the count value is T1, the CPU 120 reads out T1 from the counter 101, and calculates T3 or adds T1 to Tb (T3=T1+Tb), and sets thus obtained T3 for the timer timeout value of T[1] in the time memory 102 (step S4). At the time of this timer setting up, concurrently, the Enable bit of T[1] is set to be enable.

Then, since T [x] in the time memory 102 is updated, as data whose Enable bit is set to be enable, the CPU 120 compares T[0]=T8 and T[1]=T3 (step S5). As a result, since T3<T8, the CPU 120 sorts and updates data such that T' [x] in the comparison register 103 are T' [0]=T3, T' [1]=T8 (step S6). Then, the comparator 104 compares the count value of the counter 101 with T' [0]=T3 in the comparison register 103.

Next, before the count value of the counter 101 accords with the stored value of T' [0], a time measurement request of the time Tc is generated by the CPU 120 (step S7: YES). At this time, since the count value is T2, the CPU 120 reads out T2 from the counter 101, and calculates T4 or adds T2 to Tc (T4=T2+Tc), and sets thus obtained T4 for the timer timeout value of T[2] in the time memory 102 (step S8). At the time of this timer setting up, concurrently, the Enable bit of T[2] is set to be enable.

Then, since T [x] in the time memory 102 is updated, as data whose Enable bit is set to be enable, the CPU 120 compares T[0]=T8, T[1]=T3, and T[2]=T4 (step S9). As a result, since T3<T4<T8, the CPU 120 sorts and updates data such that T' [x] in the comparison register 103 are T' [0]=T3, T' [1]=T4, and T' [2]=T8 (step S10). Then, the comparator 104 compares the count value of the counter 101 with T' [0]=T3 in the comparison register 103.

In this embodiment, the Carry out bit of T[x] is not set up, and, in case the timer timeout value exceeds the maximum value of the counter 101, the Carry out bit is set to "1" by a Carry out signal from the counter 101. Accordingly, the timer timeout value of T[x] is so set up as to be compared with the carried out count value of the counter 101.

In this state, when the count value of the counter 101 comes to be T3, and accords with T' [0]=T3 (step S11: YES), the comparator 104 generates an interruption signal to the CPU 120 (step S12). Then, since an interruption signal to the CPU 120 is generated, the time memory 102 is notified of the interruption signal. Accordingly, of T[x] in the time memory 102, the CPU sets the Enable bit of T[1] which stores the setup value of the timer timeout value corresponding to T3 to be disable (step S13).

Then, since the Enable bit of T[1] is set to be disable, as data whose Enable bit is set to be enable, the CPU 120 compares T[0]=T8 and T[2]=T4. As a result, since T4<T8, the CPU sorts and updates data such that T'[x] in the comparison register 103 are T'[0]=T4, T' [1]=T8 (step S14).

Hereinafter, the performance for a plurality of times of the time measurement request of the time T3 is performed similarly, and then in case the count value comes to be T4, and in case the count value comes to be T8, the performance is similarly performed. On the other hand, as has not been described in this embodiment, in case the count value is updated to be "0", the time memory 102 is notified of this updating, and the Carry out bit stored in the time memory 102 is cleared.

Therefore, according to this embodiment, as the timer value to be compared with the count value of a counter, the result of sorting by use of a memory is employed, and a plurality of time measurements are realized by a single comparator. Accordingly, the size of a circuit, which is concurrently operated, can be reduced as compared with the conventional example.

Furthermore, according to this embodiment, the CPU operates when an interruption is output from the comparator. Accordingly, the processing of the CPU can be reduced, and unnecessary performances of the CPU can be significantly reduced. This advantage can be enhanced maximally when applied to a mobile communication terminal etc. in which low electric power consumption is required. That is, in a mobile communication terminal, low electric power consumption is required, unnecessary performances of the CPU has to be reduced as much as possible, and a plurality of different longtime timers are often required at the time of communication.

Moreover, according to this embodiment, since the start timing and the end timing of the time measurement can be set up every operation clock of a counter, measurement errors can be significantly reduced when performing a plurality of time measurements, which is described in above-described conventional example.

Moreover, according to this embodiment, since a plurality of data is stored in a memory, in case of generating interruption signals continuously, the work of replacement with data in a time memory becomes unnecessary, which brings about an advantage that no delay is raised in generating interruption signals.

As has been described above, according to the embodiment, the size of an operating circuit can be reduced, a plurality of time measurements can be realized with measurement errors reduced, the processing of the CPU can be reduced, and the electric power consumption can be lowered. This advantage can be enhanced maximally when applied to a timer circuit mounted on an LSI (large scale integrated circuit) for a mobile communication terminal.

Second Embodiment

Next, the second embodiment according to the present invention will be explained.

Figure 6:
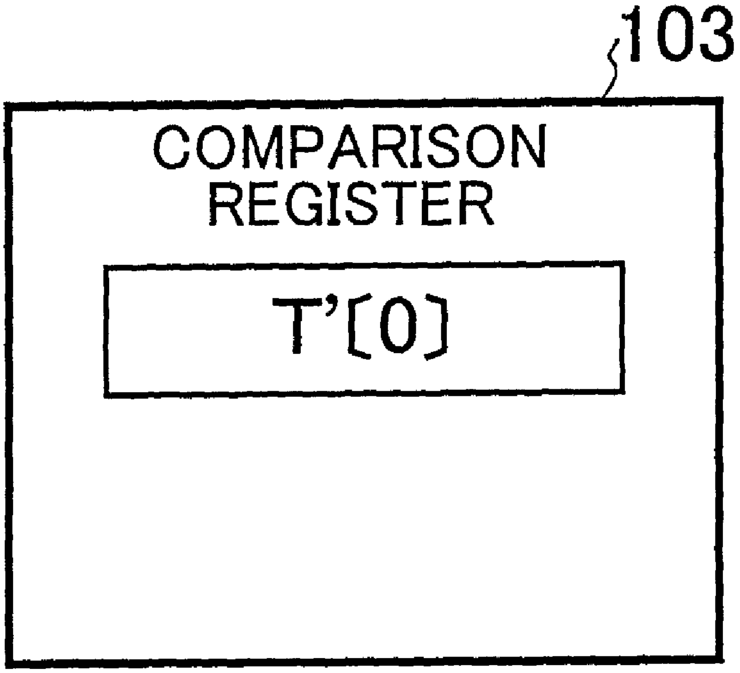
FIG. 6 shows a block diagram indicative of the configuration of a comparison register of a timer circuit in the second embodiment according to the present invention.

FIG. 6 shows a block diagram indicative of the configuration of a comparison register (second memory) 103 working as a storage unit of a timer circuit in the second embodiment. The configuration of other parts in the second embodiment is similar to that in the first embodiment. In the comparison register 103 in the first embodiment, a plurality of T' [x] are set up, and in the respective T' [x], setup values of a plurality of sets of required timer timeout time are sorted to be stored. On the other hand, in this embodiment, as shown in FIG. 6, only T' [0] is set up, and only single timer timeout time is stored. Data stored in the T' [0] is, similar to above-described case, of setup values of timer timeout values whose Enable bit is set to be enable in T[x] in the time memory 102, data which is closest to the count value.

Figure 7:
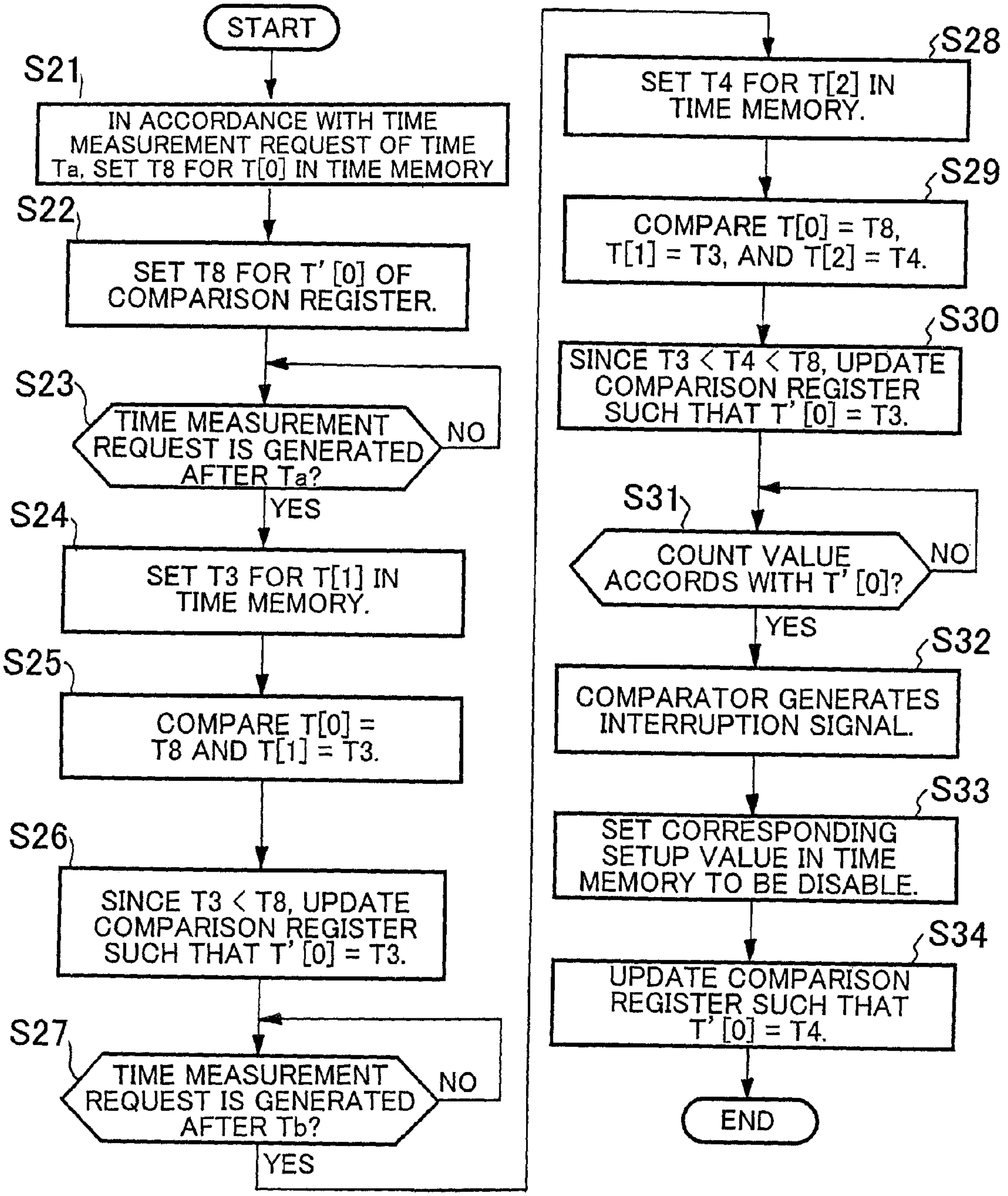
FIG. 7 shows a flowchart indicative of the performance of the timer circuit in the second embodiment according to the present invention.
Figure 8:
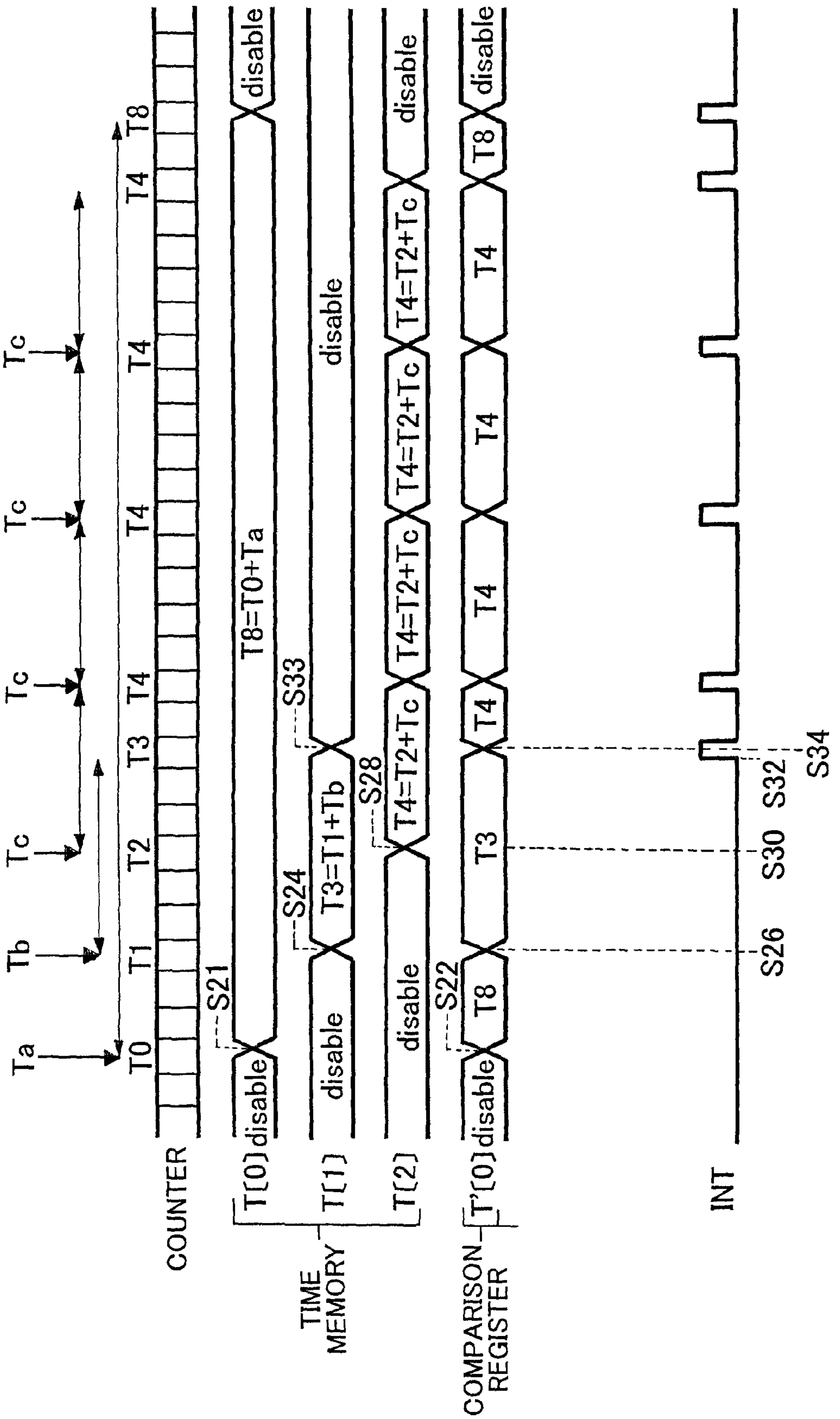
FIG. 8 shows a timing chart to explain the performance of the timer circuit in the second embodiment according to the present invention.

FIG. 7 shows a flowchart indicative of the performance in the second embodiment, and FIG. 8 shows a timing chart to explain the performance in the second embodiment. In FIG. 8, timings corresponding to respective steps in the flowchart in FIG. 7 are shown.

As shown in FIG. 7 and FIG. 8, also in this embodiment, a case in which time measurement requests of the time Ta, Tb, Tc are sent will be explained (as for the time Tc, a plurality of time measurement requests are generated).

Firstly, a time measurement request of the time Ta is generated by the CPU 120. Then, since the count value of the counter 101 is T0, the CPU 120 reads out T0 from the counter 101, and calculates T8 or adds T0 to Ta (T8=T0+Ta), and sets thus obtained T8 for the timer timeout value of T [0] in the time memory (step S21). At the time of this timer setting up, concurrently, the Enable bit of T[0] is set to be enable.

Next, since T[x] in the time memory 102 is updated, the CPU 120 sets T8 for the timer timeout value of T'[0] in the comparison register 103 (step S22). Then, the comparator 104 compares the count value of the counter 101 with T' [0]=T8 in the comparison register 103.

Next, before the count value of the counter 101 accords with the stored value of T' [0] in the comparison register 103, a time measurement request of the time Tb is generated by the CPU 120 (step S23: YES). At this time, since the count value is T1, the CPU 120 reads out T1 from the counter 101, and calculates T3 or adds T1 to Tb (T3=T1+Tb), and sets thus obtained T3 for the timer timeout value of T[1] in the time memory 102 (step S24). At the time of this timer setting up, concurrently, the Enable bit of T[1] is set to be enable.

Then, since T[x] in the time memory 102 is updated, as data whose Enable bit is set to be enable, the CPU 120 compares T[0]=T8 and T[1]=T3 (step S25). As a result, since T3<T8, the CPU 120 updates data such that, in the comparison register 103, T' [0]=T3 (step S26). Then, the comparator 104 compares the count value of the counter 101 with T' [0]=T3 in the comparison register 103.

Next, before the count value of the counter 101 accords with the stored value of T'[0], a time measurement request of the time Tc is generated by the CPU 120 (step S27: YES). At this time, since the count value is T2, the CPU 120 reads out T2 from the counter 101, and calculates T4 or adds T2 to Tc (T4=T2+Tc), and sets thus obtained T4 for the timer timeout value of T[2] in the time memory 102 (step S28). At the time of this timer setting up, concurrently, the Enable bit of T[2] is set to be enable.

Then, since T [x] in the time memory 102 is updated, as data whose Enable bit is set to be enable, the CPU 120 compares T[0]=T8, T[1]=T3, and T[2]=T4 (step S29). As a result, since T3<T4<T8, the CPU 120 updates data such that, in the comparison register 103, T' [0]=T3 (step S30). Then, the comparator 104 compares the count value of the counter 101 with T' [0]=T3 in the comparison register 103.

In this state, when the count value of the counter 101 comes to be T3, and accords with T'[0]=T3 (step S31: YES), the comparator 104 generates an interruption signal to the CPU 120 (step S32). Then, since an interruption signal to the CPU 120 is generated, the time memory 102 is notified of the interruption signal. Accordingly, of T[x] in the time memory 102, the CPU 120 sets the Enable bit of T[1] which stores the setup value of the timer timeout value corresponding to T3 to be disable (step S33)

Then, since the Enable bit of T[1] is set to be disable, as data whose Enable bit is set to be enable, the CPU 120 compares T[0]=T8 and T[2]=T4. As a result, since T4<T8, the CPU 120 updates data such that, in the comparison register 103, T' [0]=T4 (step S34).

Hereinafter, the performance for a plurality of times of the time measurement request of the time T3 is performed similarly, and then in case the count value comes to be T4, and in case the count value comes to be T8, the performance is similarly performed.

Therefore, according to this embodiment, in addition to the advantage of the first embodiment, there is brought about an advantage that, since single timer timeout time is set up in a comparison register, the configuration of the comparison register can be simplified.

Third Embodiment

Next, the third embodiment according to the present invention will be explained. In the first embodiment, as the timer value to be compared with the count value, the result of sorting by use of a memory is employed, and a single comparator is employed. On the other hand, in the third embodiment, a plurality of comparators are employed, and timer timeout values corresponding to a plurality of time measurement requests input to the respective comparators are set up.

Figure 9:
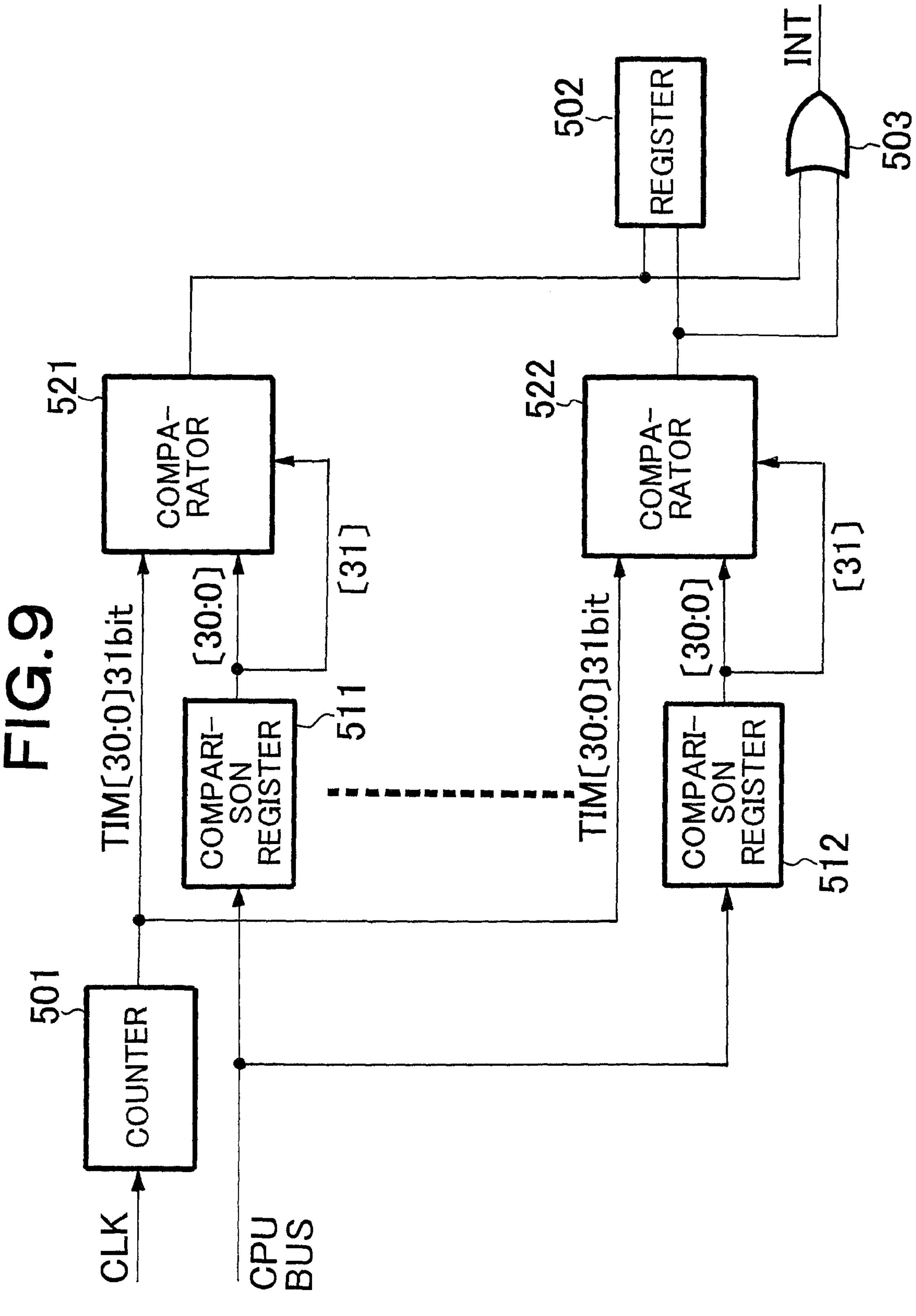
FIG. 9 shows a block diagram indicative of the configuration of a timer circuit in the third embodiment according to the present invention.

FIG. 9 shows a block diagram indicative of the configuration in the third embodiment according to the present invention. As shown in FIG. 9, the timer circuit in the third embodiment includes a CPU 530, a counter 501 of 31 bits, and further, at the side of outputting a count value TIM [30: 0] of 30 bits of the counter 501, a plurality of comparators 521, 522 are arranged. At the side of inputting a timer timeout value [30: 0] of 31 bits of the respective comparators 521, 522, there are arranged comparison registers (storage units) 511, 512, respectively. At the output side of the respective comparators 521, 522, there are arranged a register 502 and an OR circuit 503 in parallel.

The respective comparison registers 511, 512 can output, in addition to timer timeout values corresponding to respective time measurement requests, an Enable bit [31] indicative of enable/disable of the timer timeout value to the respective comparators 521, 522. When the Enable bit of the respective comparison registers 511, 512 is enable, the respective comparators 521, 522 compare the count value of the counter 501 with the timer timeout value of the respective comparison registers 511, 512, and generate an interruption signal in case both the values are coincident with each other, and output thus generated interruption signal to the register 502 and to the OR circuit 503, respectively.

The register 502 stores output values of the respective comparators 521, 522. When inputting any one of output interruption signals from the respective comparators 521, 522, the OR circuit 503 outputs the input to the CPU 530 as one interruption signal (INT). Referring to stored data of the register 502, the CPU 530 determines which one of the comparators 521, 522 outputs the interruption signal from the OR circuit 503, and performs the interruption processing based on the determination.

Therefore, also according to this embodiment, there are brought about performances and advantages similar to those in the first embodiment, and it becomes possible to reduce unnecessary interruption processing of the CPU and realize a plurality of time measurements using a single counter.

Fourth Embodiment

Next, the fourth embodiment according to the present invention will be explained. In the fourth embodiment, as compared with the third embodiment, the bit length of a counter is made large to be 38 bits, and the bit length to be input to comparators is separated to TIM [30: 0] and TIM [37: 7], which can realize time measurements with different sets of maximum measurement time using the same counter.

Figure 10:
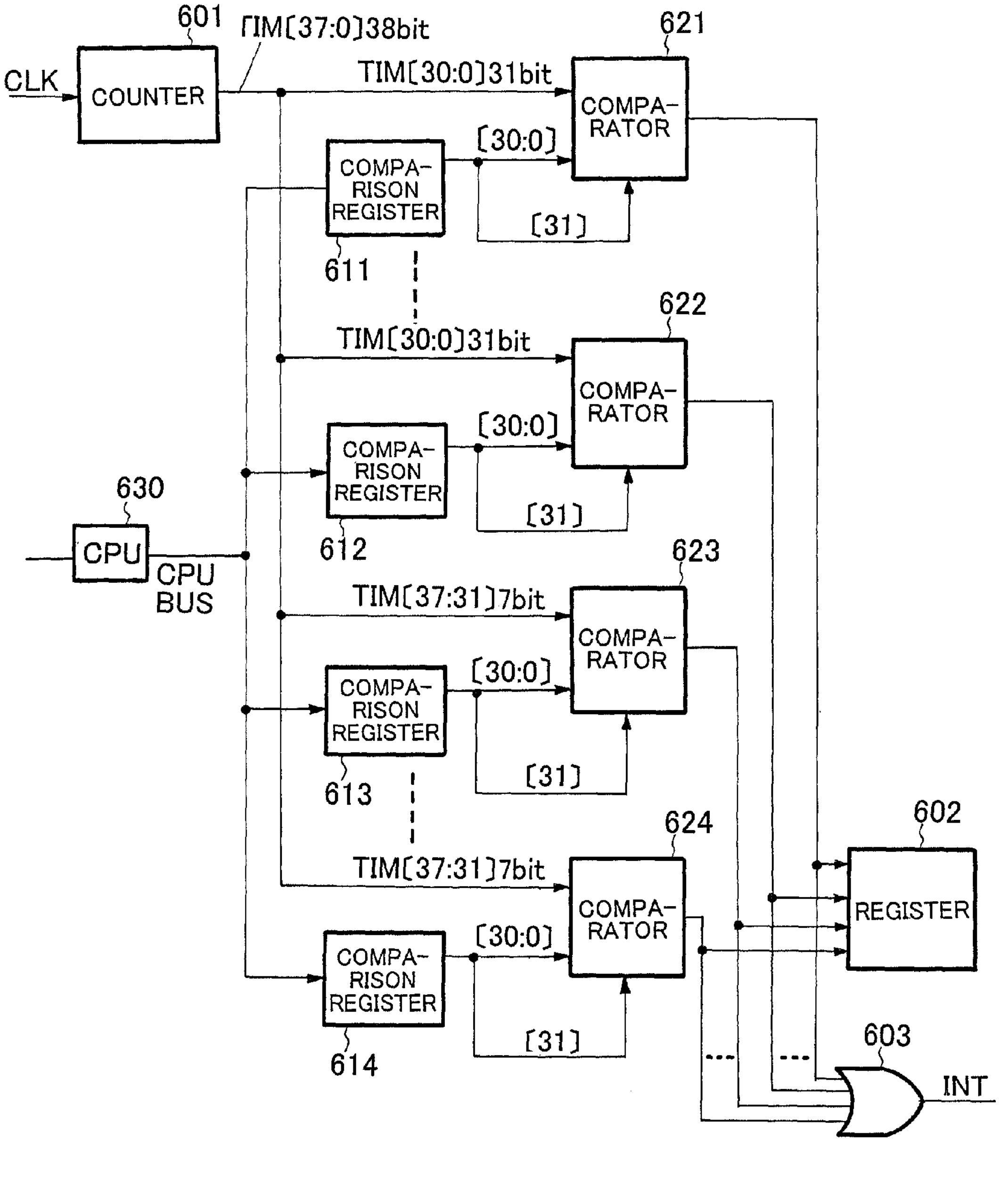
FIG. 10 shows a block diagram indicative of the configuration of a timer circuit in the fourth embodiment according to the present invention.

FIG. 10 shows a block diagram indicative of the configuration in the fourth embodiment according to the present invention. As shown in FIG. 10, the fourth embodiment includes a CPU 630, a counter 601, and further, of the sides of outputting a count value TIM [37: 0] of 38 bits of the counter 601, a plurality of comparators 621, 622 are arranged at the side of outputting a count value TIM [30: 0] of lower 31 bits, while a plurality of comparators 623, 624 are arranged at the side of outputting a count value TIM [37: 7] of upper 31 bits, respectively. At the side of inputting a timer timeout value [30: 0] of 31 bits of the respective comparators 621 to 624, there are arranged comparison registers (storage units) 611 to 614, respectively. At the output side of the respective comparators 621 to 624, there are arranged a register 602 and an OR circuit 603 in parallel.

The respective comparison registers 611 to 614 can output, in addition to timer timeout values corresponding to respective time measurement requests, an Enable bit [31] indicative of enable/disable of the timer timeout value to the respective comparators 621 to 624. When the Enable bit of the respective comparison registers 611 to 614 is enable, the respective comparators 621 to 624 compare the count value of the counter 601 with the timer timeout value of the respective comparison registers 611 to 614, and generate an interruption signal in case both the values are coincident with each other, and output thus generated interruption signal to the register 602 and to the OR circuit 603, respectively.

The register 602 stores output values of the respective comparators 621 to 624. When inputting any one of output interruption signals from the respective comparators 621 to 624, the OR circuit 603 outputs the input to the CPU 630 as one interruption signal (INT). Referring to stored data of the register 602, the CPU 630 determines which one of the comparators 621 to 624 outputs the interruption signal from the OR circuit 603, and performs the interruption processing based on the determination.

Therefore, according to this embodiment, there are brought about performances and advantages similar to those in the third embodiment, and, since the bit length of the counter is made large, and the count value to be input to the comparators is separated to the two count values of different bit lengths, it becomes possible to realize time measurements with different sets of maximum measurement time using the same counter.

APPLICATION

Figure 11:
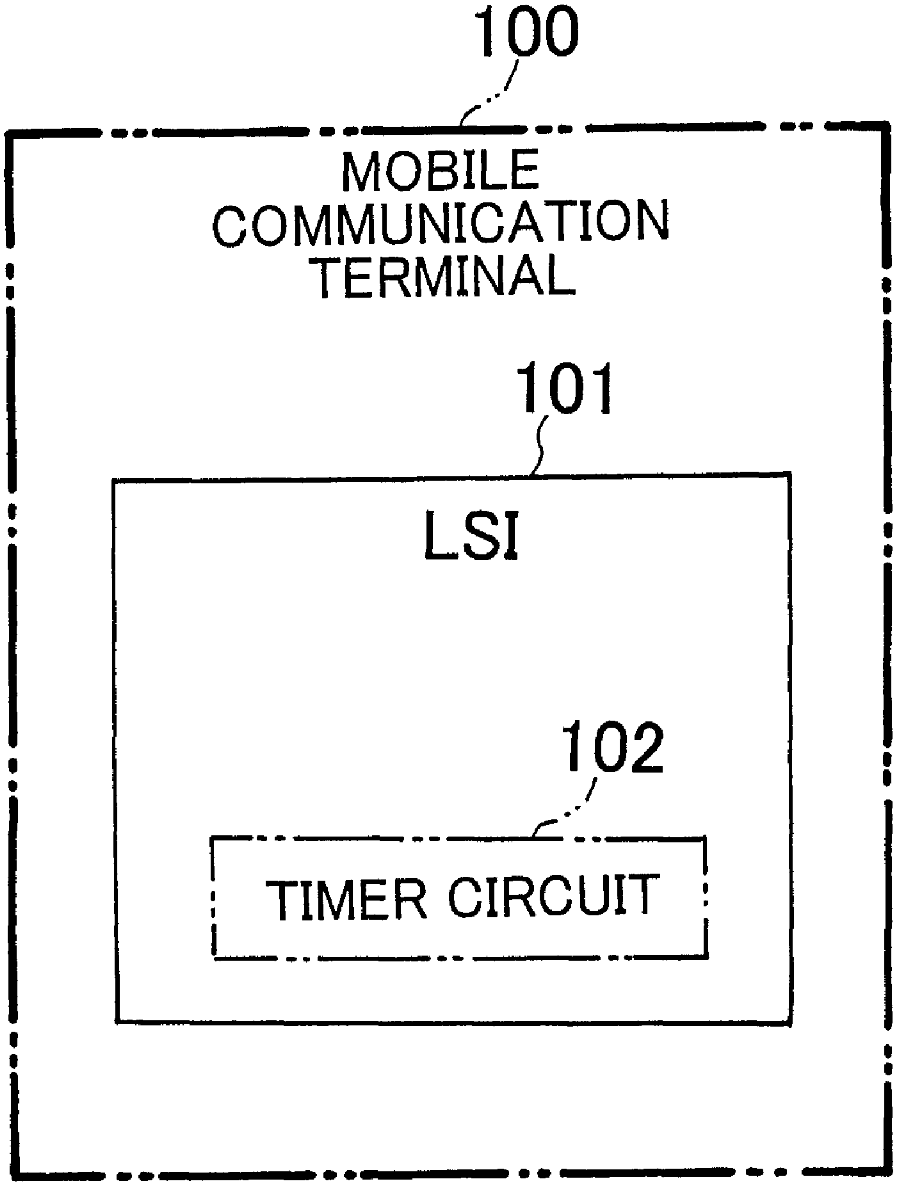
FIG. 11 shows a schematic view indicative of the configuration in which the timer circuit according to the present invention is applied to a mobile communication terminal.
Figure 12:
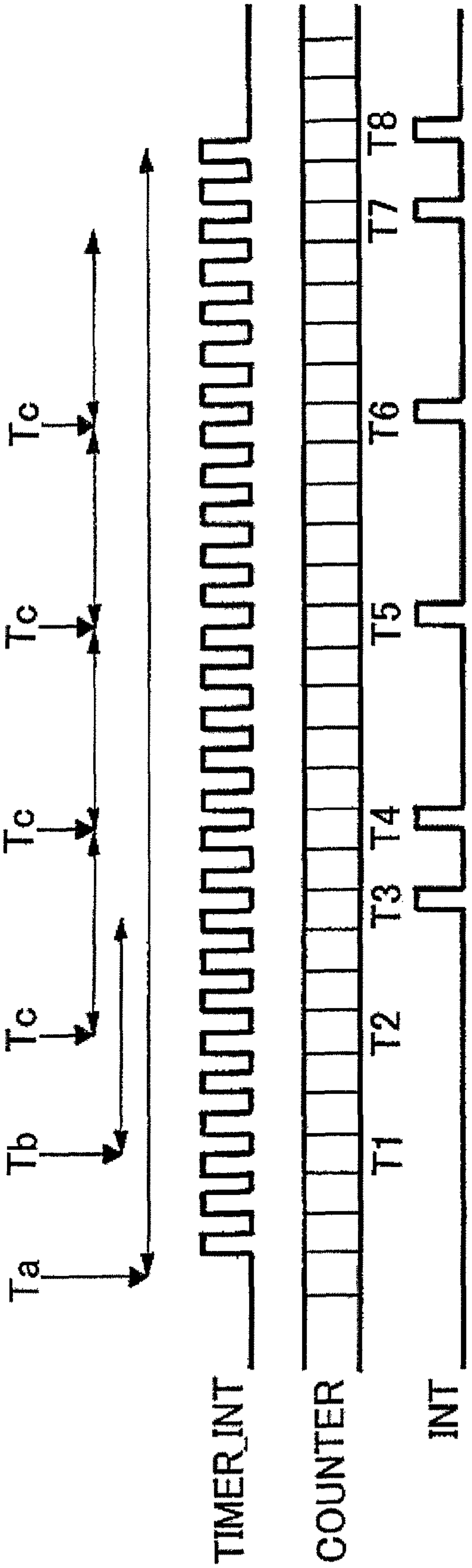
FIG. 12 Related Art
FIG. 12 shows a timing chart to explain the performance of a conventional timer circuit.

The timer circuits which have been described in the respective embodiments can be mounted to a mobile communication terminal such as a mobile telephone. In this case, for example, as shown in FIG. 11, to one or plural LSI (large scale integrated circuit) 101 configuring at least part of respective units or a wireless application unit, a signal processing unit, a control unit, etc., not shown, which configure a mobile communication terminal 100, a timer circuit 102 of above-described configuration is mounted. On the other hand, above-described timer circuits can be applied to electronic devices other than a mobile communication terminal.

While the present invention has been described in accordance with the certain preferred embodiments with reference to the accompanying drawings in detail, it should be understood that the present invention is not limited to these embodiments, but various modifications, alternative constructions or equivalents can be implemented without departing from the scope and spirit of the present invention.

INDUSTRIAL APPLICABILITY

The present invention can be applied to a timer circuit mounted on an electronic device such as a mobile communication terminal, and specifically, to a timer circuit mounted on various circuits such as an LSI for a mobile communication terminal such as a mobile telephone.

The invention claimed is:

1. A timer circuit, comprising:

a counter that operates under a reference clock;

a storage unit that stores a timer timeout time corresponding to a time measurement request when receiving the time measurement request from a CPU; and a comparator that compares the time corresponding to an output value of the counter with the timer timeout time stored in the storage unit, and outputs an interruption signal to the CPU when both the two sets of time are coincident with each other;

wherein the storage unit includes:

a first memory that stores a plurality of sets of timer timeout time corresponding to a plurality of time measurement requests; and a second memory that stores, of the plural sets of timer timeout time stored in the first memory, at least the timer timeout time which is closest to the time corresponding to the output value of the counter and the timer timeout time stored in the second memory is set to the timer timeout time to be compared by the comparator, wherein the first memory stores enable information to set up whether the plural sets of timer timeout time are enable or disable, and enable information of the corresponding timer timeout time is set to be disable when an interruption signal is generated by the comparator, and the second memory stores the timer timeout time whose enable information is set to be enable, and wherein the first memory stores carry out information which indicates whether or not the counter is carried out, and the timer timeout time is updated based on the carry out information when the counter is carried out.

2. The timer circuit according to claim 1, wherein the storage unit includes:

sort means for rearranging the plural sets of timer timeout time stored in the first memory in the order ranging from the time closest to the time corresponding to the output value of the counter; and setup means for setting up the plural sets of timer timeout time sorted by the sort means in the second memory.

3. The timer circuit according to claim 1, wherein the second memory stores only the timer timeout time which is closest to the time corresponding to the output value of the counter.

4. The timer circuit according to claim 1, wherein the second memory is updated when the plural sets of timer timeout time stored in the first memory are updated.

5. A mobile communication terminal that has a timer circuit according to claim 1.

6. An electronic device that has a timer circuit according to claim 1.

* * * * *